United States Patent
Zhao et al.

(10) Patent No.: US 8,570,979 B2
(45) Date of Patent: *Oct. 29, 2013

(54) MOBILITY MECHANISM FOR SERVICE CONTINUITY WITH CORE ELEMENT FAILURE

(75) Inventors: Xiaoming Zhao, Plano, TX (US); Wei Wu, Santa Clara, CA (US); James Earl Womack, Bedford, TX (US); Zhijun Cai, Euless, TX (US); Jan Hendrik Lucas Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 6 days.

This patent is subject to a terminal disclaimer.

(21) Appl. No.: 13/298,846

(22) Filed: Nov. 17, 2011

(65) Prior Publication Data
US 2012/0063419 A1 Mar. 15, 2012

Related U.S. Application Data

(63) Continuation of application No. 12/099,655, filed on Apr. 8, 2008, now Pat. No. 8,064,403.

(60) Provisional application No. 60/956,531, filed on Aug. 17, 2007.

(51) Int. Cl.
*H04W 4/00* (2009.01)

(52) U.S. Cl.
USPC .......................................................... 370/331

(58) Field of Classification Search
USPC ............................ 370/328–339; 455/436–444
See application file for complete search history.

(56) References Cited

U.S. PATENT DOCUMENTS

| | | |
|---|---|---|
| 6,230,281 B1 | 5/2001 | Brodfuhrer et al. |
| 6,324,161 B1 | 11/2001 | Kirch |
| 6,735,631 B1 | 5/2004 | Oehrke et al. |
| 7,080,151 B1 | 7/2006 | Borella et al. |
| 7,227,863 B1 | 6/2007 | Leung et al. |
| 2006/0046724 A1 | 3/2006 | Ton et al. |
| 2008/0268846 A1 | 10/2008 | Shaheen |
| 2009/0061878 A1 | 3/2009 | Fischer |

FOREIGN PATENT DOCUMENTS

| | | |
|---|---|---|
| WO | 9852375 A2 | 11/1998 |
| WO | 0201902 A1 | 1/2002 |

OTHER PUBLICATIONS

IST-4-027756 Winner II, D4.8.2 v1.0, Cooperation schemes validation, Information Society Technologies, 113 pages, Jun. 2007.*
Zhao, Xiaoming, et al.; U.S. Appl. No. 12/099,655; Title: Mobility Mechanism for Server Continuity; filed Apr. 8, 2008.

(Continued)

*Primary Examiner* — Frank Duong
(74) *Attorney, Agent, or Firm* — Conley Rose, P.C.; J. Robert Brown, Jr.

(57) ABSTRACT

A system comprising an inter-RAT/inter-network redundancy controller (IRC) is provided. The IRC is configured to communicate with a source gateway in communication with a source radio access network (RAN) using a first radio access technology (RAT). The IRC is further configured to communicate with a target gateway in communication with a target RAN using a second RAT. The IRC is further configured to promote a handover of a user equipment from the source RAN connected to the source gateway to the target RAN connected to the target gateway when the source gateway fails.

17 Claims, 8 Drawing Sheets

(56) References Cited

OTHER PUBLICATIONS

3GPP TR 23.882 V1.9.0; Techincal Specification Group Services and System Aspects; 3GPP System Architecture Evolution: Report on Techincal Options and Conclusions; Release 7; Section 7.16; Mar. 2007; 10 pages.

3GPP TR 23.882 V1.11.0; 3rd Generation Partnership Project; Technical Specification Group Services and System Aspects; 3GPP System Architecture Evolution: Report on Technical Options and Conclusions; Release 7; Jul. 2007; 29 pages.

3GPP TSG SA WG2 Architecture—S2#53; "Network Redundancy in LTE/SAE;" S2-062097; Lisbon, Portugal; Jun. 26-30, 2006; 4 pages.

3GPP TSG SA WG2 Architecture—S2#50; "Grouping of Core Network Entities;" S2-060251; Budapest, Hungary; Jan. 16-20, 2006; 7 pages.

Office Action dated Jan. 31, 2011; U.S. Appl. No. 12/099,655, filed Apr. 8, 2008; 16 pages.

Notice of Allowance dated Oct. 18, 2011; U.S. Appl. No. 12/099,655, filed Apr. 8, 2008; 7 pages.

PCT International Search Report; Application No. PCT/US2008/064706; Nov. 19, 2008; 4 pages.

PCT Written Opinion of the International Searching Authority; Application No. PCT/US2008/064706; Nov. 19, 2008; 9 pages.

International Preliminary Report on Patentability; Application No. PCT/US2008/064706; Dec. 1, 2009; 8 pages.

\* cited by examiner

MOBILITY MECHANISM FOR SERVICE CONTINUITY WITH CORE ELEMENT FAILURE

CROSS-REFERENCE TO RELATED APPLICATIONS

The present application is a continuation of U.S. patent application Ser. No. 12/099,655 filed Apr. 8, 2008 by Xiaoming Zhao, entitled "Mobility Mechanism for Service Continuity" (32622-US-PAT-4214-03001) which claims benefit of and priority to U.S. Provisional Patent Application No. 60/956,531, filed Aug. 17, 2007, by Xiaoming Zhao, entitled "Mobility Mechanism for Mobile Device Service Continuity with Core Element Failure" (32622-US-PRV-4214-03000), which are incorporated by reference herein as if reproduced in their entirety.

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A UE might communicate with a second UE, some other component in a telecommunications network, an automated computing device such as a server computer, or some other device, any of which can be referred to as a node or an element. A communications connection between a UE and another node or element might promote a voice call, a file transfer, or some other type of data exchange, any of which can be referred to as a call or a session.

As technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a UE can gain access to a telecommunications network might be referred to by a name other than "cell", such as "hot spot". As used herein, the term "cell" will be used to refer to any region in which a UE can gain access to a telecommunications network, regardless of whether the UE is a traditional cellular device, an LTE device, or some other device.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as Third Generation Partnership Project 2 (3GPP2) IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMAX), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. An example of an application-layer protocol that can be used in a packet switching wireless network is the Session Initiation Protocol (SIP). SIP has been standardized and governed primarily by the Internet Engineering Task Force (IETF). The IP (Internet Protocol) Multimedia Subsystem (IMS) is a packet switched technology that allows multimedia content to be transmitted between nodes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
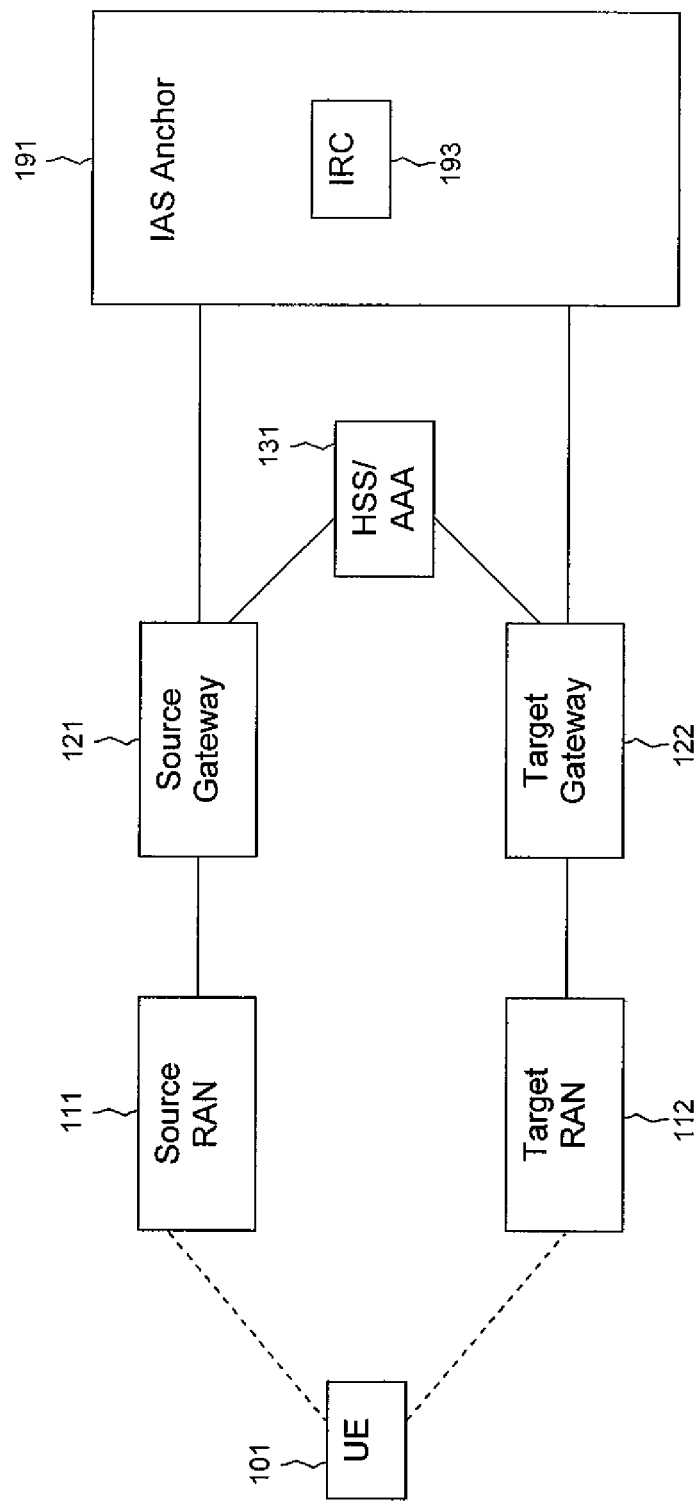
FIG. 1 is an illustration of a wireless telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system comprising an inter-RAT/inter-network redundancy controller (IRC) is provided. The IRC is configured to communicate with a source gateway in communication with a source radio access network (RAN) using a first radio access technology (RAT). The IRC is further configured to communicate with a target gateway in communication with a target RAN using a second RAT. The IRC is further configured to promote a handover of a user equipment from the source RAN connected to the source gateway to the target RAN connected to the target gateway when the source gateway fails.

In an alternative embodiment, a system is provided comprising at least one processor configured to promote performing a method for backing up a failed source gateway when a source radio access network (RAN) configured to communicate with the source gateway is unable to communicate with a target RAN. The method comprises detecting the source gateway failure; identifying a target gateway configured to communicate with the target RAN; querying for information regarding at least one user equipment (UE) previously in communication with the source gateway; promoting a redundancy control component transmitting a redundancy backup request to the target gateway; mapping a first plurality of RANs that are configured to communicate with the target gateway and that are overlaid with a second plurality RANs that are configured to communicate with the source gateway; identifying the target RAN among the first plurality of RANs; promoting the target gateway sending a redundancy backup request to the target RAN; promoting the target RAN sending a relocation command to the at least one UE; establishing radio and core transfer and bearer communication between the target RAN and the at least one UE; and establishing IP bearer service between the at least one UE and the redundancy control component.

In an alternative embodiment, a system is provided comprising at least one processor configured to promote performing a method for backing up a failed source gateway when a source radio access network (RAN) configured to communicate with the source gateway is able to communicate with a target RAN. The method comprises detecting the source gateway failure; identifying a target gateway configured to communicate with the target RAN; querying for information regarding at least one user equipment (UE) previously in communication with the source RAN and the source gateway; promoting a redundancy control component transmitting a redundancy backup request to the target gateway; mapping a first plurality of RANs that are configured to communicate with the target gateway and that are overlaid with a second plurality RANs that are configured to communicate with the source gateway; identifying the target RAN among the first plurality of RANs; promoting the target gateway sending a redundancy backup request to the target RAN; promoting the target RAN initiating redundancy backup with the source RAN; establishing a core bearer for the at least one UE; establishing a radio bearer for the at least one UE; and establishing IP bearer service between the at least one UE and the redundancy control component.

The wireless packet switching domain services for both voice and data have greatly evolved to include broadband, high speed, and multi-media services using different radio access technologies (RATs) such as UMTS, GPRS, Enhanced Data rates for Global Evolution (EDGE), CDMA 2000, 3GPP-LTE, 3GPP2-LTE, WLAN, and WiMAX. To satisfy end user service demands with the technologies that have historically evolved, an operator may deploy multiple radio access networks in the same geophysical locations, fully or partially overlaid. There may also be cases in which different operators share the same radio access network with the same or different radio frequencies. For inter-RAT/inter-network systems, operators may wish to support inter-working functionality that allows UEs to camp in or hand over to different RATs according to the service needs of the UEs, radio conditions, and network load balancing considerations.

In the course of the evolution of wireless telecommunications, wireless inter-working between different RATs and different network/operational service intersections and overlays has been developed. There have been discussions among different telecommunication organizations (such as 3GPP, 3GPP2, and IEEE) on the requirements and solutions for inter-working between 3GPP LTE and 3GPP2 and inter-working between 3GPP LTE and WiMAX. There have also been discussions regarding requirements and solutions for intra-LTE issues and for inter-working between 3GPP and WLAN and inter-working between 3GPP LTE and pre-3GPP LTE technologies (such as UMTS/CPRS). An important aspect for wireless network inter-networking is inter-working mobility handling triggered by mobility drivers such as UE capabilities and supported services, radio conditions, and network load balancing for UEs in the active state or camped in the idle state. 3GPP specification TS 36.300 has summarized the important LTE mobility control drivers and limitations.

Within any of these RATs, a capability might exist for detecting when an abnormal condition occurs to an element in the core network of the system. For example, when a packet service or circuit service switch, a media gateway, a mobility anchor switch, a gateway switch, or another core element fails, this condition can be detected and managed by keep-alive type messages between the core network elements or in some other known manner. For network management, core network signaling, for example by a signaling transfer point, might inform the other network nodes not to deliver any traffic to the node that is out of service until that node is recovered.

To provide continued services and/or to minimize the service interruption time in the case of a core network element failure, network redundancy mechanisms, such as geographical redundancy, have been developed to back up the failed system. In a typical redundant wireless network system, one or more extra network elements are needed for load sharing or active/standby backup. In an N+1 redundant wireless network with N+1 load sharing, the N+1 elements are all active under normal operation and each operates at a maximum of N/(N+1) of its capacity to ensure that its capacity will not be exceeded if one of the elements fails.

The configuration for wireless network load sharing redundancy can be more complicated. For the N+1 active/standby case, under normal operation there are N active elements and one standby element. The standby element should typically be a super element among the N+1 elements that can back up the services of any failed element. In addition, all of the signaling and bearer connections from the active elements to the standby element might be required in an active/standby system. A switchover from an active element to a standby element might entail a relatively long service interruption because of the time needed for database setup, system reconfiguration, and system startup on the standby element.

In general, the traditional wireless network redundancy mechanism can be very costly. However, for a wireless network without a system-wide redundancy mechanism, many services could be interrupted when a core network element fails. To minimize service outage, most wireless telecommunication system operators have system-wide redundancy mechanisms in place. System recovery procedures have been provided by vendors and operators to minimize service down time.

In an embodiment, a network redundancy mechanism is provided to handle wireless core network element failure and to minimize service interruption time with low or no extra cost for wireless network redundancy. When a failure occurs in a wireless core network element, the element failure might be detected by another network element via inter-element keep-alive messages. For a 3GPP LTE wireless network with inter-RAT/inter-network functionalities (such as 3GPP LTE to non-3GPP) and with sufficient radio channel resources for inter-working, instead of establishing a traditional load sharing or an active/standby redundant backup system, the network, in an embodiment, can initiate an inter-working mobility trigger to redirect impacted idle UEs and hand over impacted active UEs to another RAT for continued services.

For cases where such a mobility action is taken between a 3GPP LTE network and a non-3GPP network, the mobility trigger can be considered the LTE mobility function of inter-network inter-RAT redundancy. For cases where such a mobility action is taken between different RATs within a 3GPP network or within a non-3GPP network, the mobility trigger can be considered the mobility function of intra-network inter-RAT redundancy. When the LTE mobility action is triggered by a core network element failure, mechanisms utilizing some or all of the other mobility drivers can be used to provide continued services to the impacted UEs. In addition, the total network load could be rebalanced. This mechanism is applicable to wireless network systems such as, but not limited to, LTE inter-ENB, LTE and pre-LTE 3GPP inter-RAT (such as LTE and UTRAN/GERAN (UMTS Terrestrial Radio Access Network/GSM EDGE Radio Access Network)), and LTE and non-3GPP (such as 3GPP2 and WiMAX). The basic principle is applicable to other wireless networks. In comparison to traditional wireless network redundancy methods, the cost and operational complexity for wireless network redundancy realization can be reduced by making use of the existing inter-RAT/inter-network overlay resource bandwidth without redundant elements in place.

In an embodiment, the network redundancy mechanism might include a first network configured to communicate with a first serving gateway, a second network configured to communicate with a second serving gateway, and an inter-working redundancy control mechanism configured to communicate with the first and second gateways. The system might also include a UE that communicates with the first network. When the first serving gateway experiences a failure, the inter-working redundancy control mechanism promotes the UE communicating via the second network and the second serving gateway.

FIG. 1 illustrates an embodiment of two overlaid radio access networks (RANs) in which inter-working functionalities can be provided. A source RAN 111 and a target RAN 112 each use one or more technologies such as GPRS/EDGE, UMTS, 3GPP LTE, WLAN, WiMAX, and/or CDMA 2000. Internet protocols (IP) IPV4 and/or IPV6 are supported by these technologies. Geographically, the source RAN 111 and the target RAN 112 might be intersected and/or overlaid. In addition, the source RAN 111 and the target RAN 112 might be serviced by any or a combination of Internet Protocol-based networks, packet-based networks, public switched telecom networks (PSTN), and/or integrated services digital networks.

A UE 101 is connected via the source RAN 111 to a source gateway 121. The source RAN 111 connects to at least one radio access cell by which the source RAN 111 provides services to the UE 101 via an air interface. The UE 101 maintains a list of neighbor cells for its mobility applications. The UE's neighbor cell list may consist of mixed cells from different RANs and different wireless networks because of the inter-RAT and inter-network geographic intersections and/or overlays. The UE 101 measures the radio channel parameters for the cells on its neighbor cell list and reports its measurements to the source RAN 111 periodically or as instructed by the source RAN 111. The source RAN 111 receives the measurement reports from the UE 101 and passes the reports to the source gateway 121.

The source RAN 111 might monitor the status of the source gateway 121 via keep-alive messages. In an embodiment, to maintain UE service continuity, if the source RAN 111 detects that the source gateway 121 is out of service, the source RAN 111 sends redundancy handover/relocation commands to the UE 101 and indicates an identifier for a target RAN 112. The source RAN 111 might send the commands immediately upon detecting the failure of the source gateway 121 or might wait for a redundancy function trigger from the core network.

In an embodiment, if the source gateway 121 fails, service for the UE 101 is redirected, via the target RAN 112, to a target gateway 122. The gateways (the source gateway 121 and the target gateway 122) can have the combined functionalities of a mobility management element (MME), a user plane element (UPE), a serving gateway (SGW), a packet data network gateway (PDN GW), and/or other core network elements. These core network elements should be considered logical elements that could be physically collocated or separated. The UE 101, the source RAN 111, the source gateway 121, the target RAN 112, and the target gateway 122 can belong to any of, but are not limited to, the types in the nine inter-working cases described in the following table:

| | | | | Network Relocation Types | | | | | |
|---|---|---|---|---|---|---|---|---|---|
| Network Element Types | 1 Inter eNB | 2 2G/3G to LTE | 3 LTE to 2G/3G | 4 LTE to WiMAX | 5 WiMAX to LTE | 6 LTE to 3GPP2 | 7 3GPP2 to LTE | 8 2G/3G to WLAN | 9 WLAN to 3GPP |
| Source RAN | eNB source | 2G/3G RAN | EUTRAN | EUTRAN | WiMAX RAN | EUTRAN | 3GPP2 RAN | 2G/3G RAN | WLAN RAN |
| Target | eNB | EUTRAN | 2G/3G | WIMAX | EUTRAN | 3GPP2 | EUTRAN | WLAN | 2G/3G |

-continued

Network Relocation Types

| Network Element Types | 1<br>Inter eNB | 2<br>2G/3G to LTE | 3<br>LTE to 2G/3G | 4<br>LTE to WiMAX | 5<br>WiMAX to LTE | 6<br>LTE to 3GPP2 | 7<br>3GPP2 to LTE | 8<br>2G/3G to WLAN | 9<br>WLAN to 3GPP |
|---|---|---|---|---|---|---|---|---|---|
| RAN Source GW | target MME/EPS source | 2G/3G MME/UPE | RAN MME/EPS | RAN MME/EPS | RAN MME/EPS WiMAX PDN GW | RAN MME/EPS | 3GPP2 PDN GW | RAN 2G/3G MME/UPE | RAN WLAN PDN GW |
| Target GW | MME/EPS target | MME/EPS | 2G/3G MME/UPE | WiMAX PDN GW | MME/EPS | 3GPP2 PDN GW | MME/EPS | WLAN PDN GW | 2G/3G MME/UPE |
| UE | support LTE | support 2G/3G, LTE | support 2G/3G, LTE | support WIMAX, LTE | support WiMAX, LTE | support LTE, 3GPP2 | support LTE, 3GPP2 | support 2G/3G, WLAN | support 2G/3G, WLAN |

A home subscriber server (HSS) or an authentication, authorization and accounting (AAA) server 131 stores policy and tracking/location information for subscribers to a wireless telecommunications service. A logical inter-access system (IAS) anchor 191 terminates IP access service and manages inter-system IP service termination, inter-system routing and billing, and IP bearer services. Physically, the IAS anchor 191 could be collocated with a gateway. The source RAN 111 and the target RAN 112 are typically furnished with multiple radio channel resources. Each RAN 111 and 112 measures its radio channel resources and reports the utilization of its radio channel resources to its respective gateway 121 and 122, which then pass this information on to the IAS anchor 191 via internet protocols.

In an embodiment, an inter-RAT/inter-network redundancy controller (IRC) 193, which can be a separate entity or can be collocated with the IAS anchor 191, connects the gateways in the inter-RAT/inter-network system via internet protocols and manages the inter-RAT/inter-network redundancy functionality. In an embodiment, the IRC 193 receives radio resource utilization status reports from the source gateway 121 and the target gateway 122, maintains inter-RAT/inter-network system overlay topology information, maintains inter-RAT/inter-network radio resource utilization status, and keeps the status updated when new reports arrive. In addition, the IRC 193 can monitor and detect core network element failures, retrieve from and store in the HSS/AAA 131 information on identities of the UE 101 and RANs 111 and 112, and analyze and provide a network element failure service backup strategy.

The IRC 193 can also determine if the redundancy backup function should be triggered when a core network element failure is detected. If the available radio resources are insufficient, the backup function may not be triggered. If a decision is made to perform a core network redundancy backup, the IRC 193 can trigger the system backup function by sending the gateways 121 and 122 redundancy backup request messages that contain the identifier of the target RAN 112 and information on the impacted UE 101. In addition, the IRC 193 can report redundancy events to the network management system or to the network operations center (NOC) and assist in network system load balancing management.

In an embodiment, the source gateway 121 supports the inter-RAT/inter-network redundancy functionality by receiving the radio resource utilization reports from the source RAN 111 and passing the reports to the IRC 193. The source gateway 121 also maintains gateway-related inter-RAT/inter-network overlay information. In addition, the source gateway 121 can receive redundancy backup request messages from IRC 193, process the messages, and determine which RAN be used as the backup target RAN 112. This might be done through use of the RAN overlay mapping list. The source gateway 121 might then issue backup messages to the target RAN 112.

In an embodiment, if the source RAN 111 receives a redundancy backup command from the target RAN 112, the source RAN 111 can process the relocation of the UE 101 to the target RAN 112 by issuing a redundancy backup command to the UE 101 that contains the identifier for the target RAN 112. The target RAN 112 can receive a redundancy backup command from the target gateway 122 and, if a signaling path between the target RAN 112 and the source RAN 111 exists, the target RAN 112 can issue a redundancy backup command to the source RAN 111 with information for UE relocation. If a signaling path between the target RAN 112 and the source RAN 111 does not exist, the target RAN 112 might broadcast the redundancy backup command to the UE 101 directly via a paging channel. The target RAN 112 can then receive the UE's response and continue the service.

For simplicity, only the non-roaming system architecture is presented in FIG. 1. Also, it should be noted that the lines connecting the elements in the drawing can represent bearer connections, signaling connections, or both. Traditionally, a different style of line is used to represent each type of connection. However, for the sake of clarity in the drawing, bearer connections and signaling connections are both represented by solid lines in FIG. 1. The dashed lines connecting the UE 101 to the source RAN 111 and the target RAN 112 are intended to represent the fact that the UE 101 might be connected to the source RAN 111 at a first time and to the target RAN 112 at a second time via the air interface.

Figure 2:
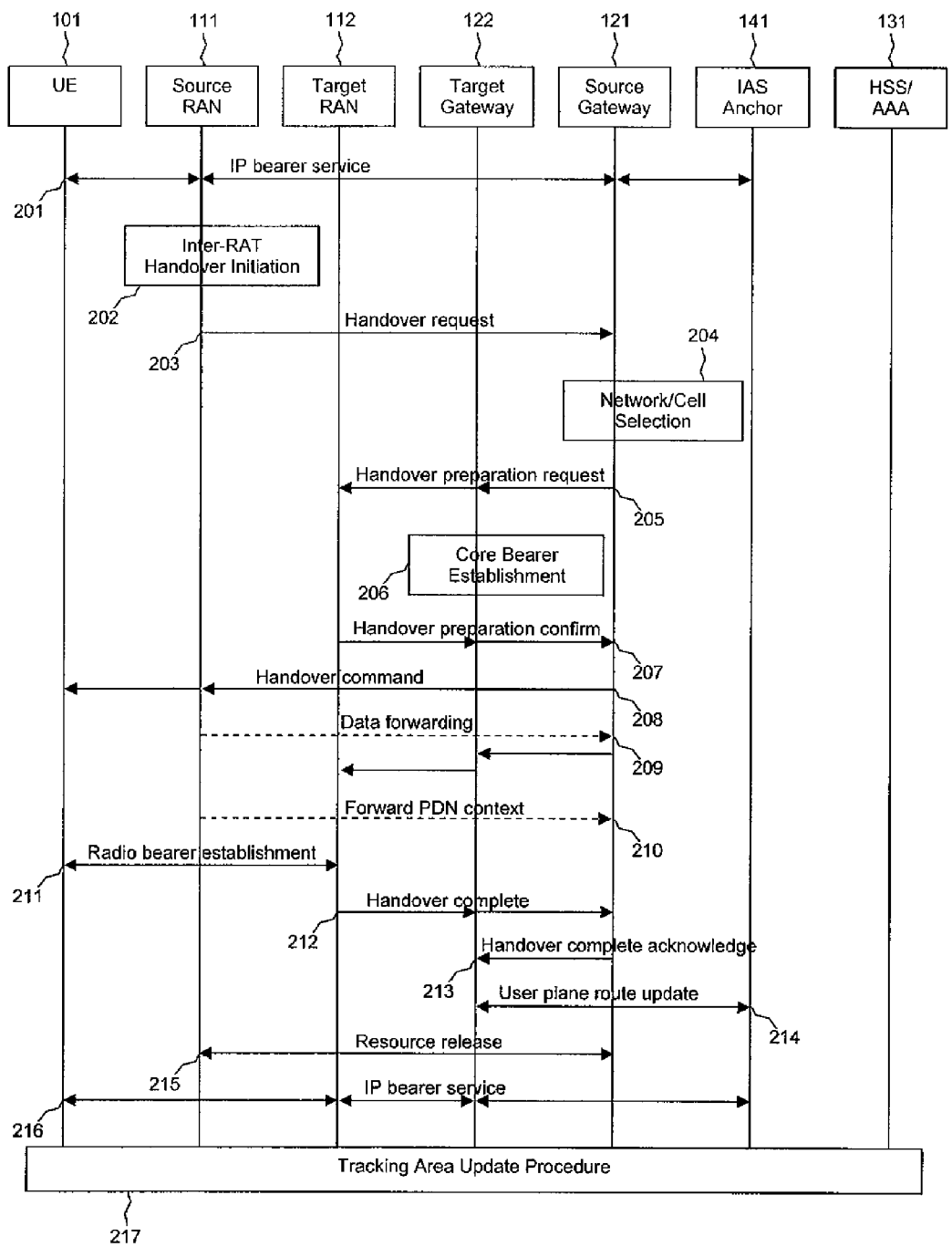
FIG. 2 is a call flow diagram according to the prior art.

When the core network elements in FIG. 1 are in service and under normal operation and a decision is made to hand a call over to a different RAT, the UE 101 can be handed over from the source RAN 111 to the target RAN 112 following the handover procedures shown in FIG. 2, which will be familiar to one of skill in the art. At event 201, IP bearer service is established between the UE 101 and a traditional IAS anchor 141 via the source RAN 111 and the source gateway 121. Since FIG. 2 is a depiction of a prior art procedure, the traditional IAS anchor 141 is not related to the IRC 193 as is the case in the embodiment of the IAS anchor 191 in FIG. 1.

At event 202, the source (serving) RAN 111 initiates a handover to the target RAN 112. At event 203, the source (serving) RAN 111 issues a handover request including the handover target to its source gateway 121. At event 204, the source gateway 121 selects the target gateway 122 serving the target RAN 112 as the target gateway that the UE 101 is going to use. At event 205, the source gateway 121 sends a handover preparation request to the target RAN 112 via the selected target gateway 122. At event 206, the target gateway 122 establishes bearer resources for the UE 101. At event 207, the target RAN 112 confirms the handover preparation to the source gateway 121 via the selected target gateway 122. At event 208, the source gateway 121 commands the UE 101 to change to the target RAN 112.

At event 209, for quality of service, in cases where the source RAN 111 is a third generation (3G) element, the source RAN 111 may start to forward data to its 3G source gateway 121. Then the source gateway 121 forwards the data to the target RAN 112 via the target gateway 122. Depending on the required quality of service, other actions might be taken by the source RAN 111 for data forwarding to minimize data loss. At event 210, in cases where the source RAN 111 is a 3G element, the source RAN 111 may send a forward PDN context message to its source gateway 121. The message may contain information for data transfer continuation by a new RAN for lossless relocation.

At event 211, a radio bearer is established between the UE 101 and the target RAN 112. At event 212, the target RAN 112 informs the source gateway 121 about handover completion. At event 213, the source gateway 121 acknowledges the handover completion to the target gateway 122. At event 214, the target gateway 122 updates the route from the traditional IAS anchor 141 to itself. Mobile terminated packets can then arrive at the target gateway 122. At event 215, resources in the source system (RAN 111 and gateway 121) are released. At event 216, IP bearer service is established between the UE 101 and the traditional IAS anchor 141 via the target RAN 112 and the target gateway 122. At event 217, the UE 101 may need to perform a tracking area update with the new serving gateway 122. This triggers the target gateway 122 to register with the HSS/AAA 131.

The above discussion has focused on a situation where the core network elements are in service and under normal operation. An embodiment of an inter-RAT/inter-network redundancy mechanism to back up a failed core element will now be considered. Specifically, a failure of a serving gateway such as the source gateway 121 will be discussed. Under such a failure, before a RAN starts to shut down its services to the UEs, it may be desirable for the UEs to still have radio access to the serving RAN for a given time period, even though the signaling and user plane services from an uplink may be interrupted.

Failures of a serving RAN are not addressed in this disclosure because if any failure occurs to a serving RAN, the impacted UEs will lose their radio access (radio link failure) immediately and, after a very short time period (e.g., a few seconds), the UEs will start to search for other available RANs for services. Failure of the HSS/AAA 131 is not addressed in this disclosure because the HSS/AAA 131 normally has a redundant counterpart in most deployments. In this disclosure, it is also assumed that the IAS anchor 191 has a redundant counterpart since it connects to all the gateways in the inter-RAT/inter-network system. Therefore, failure of the IAS anchor 191 is not addressed in this disclosure.

Returning to FIG. 1, it will be assumed for the remainder of this disclosure that the source gateway 121 has failed. In this situation, if there is no redundancy mechanism to back up the services for the source gateway 121, services for the UEs 101 serviced by the serving RANs under the source gateway 121 might be shut down as the serving RANs lose data and control. The beginning of service shut down may take some time. During this time period, the UE services could be transferred to the available radio resources in the other RANs overlaid on the impacted serving RANs. The transfer of UE services could include a handover of services for active UEs 101 or cell reselection for idle UEs 101.

The following issues and possible solutions might arise in relation to backing up the services of a failed serving gateway using mobility mechanisms: serving gateway failure detection, decision making on redundancy backup mobility procedure trigger, centralized radio resources management entity, information required for target RAN (or cell) determination for the UEs, UE information retrieval and UE classification, modifications to mobility procedures for redundancy backup, classification of mobility procedures for redundancy backup, dual mode UE and inter-RAT UE neighbor cell measurement, UE monitoring the target RAN paging channel, and UE responses to a redundancy backup command having a target cell ID/RAN ID. Each of these issues and possible solutions will now be considered in turn.

Serving Gateway Failure Detection

In general, keep-alive type query and response messages might be used between network elements. When a timer times out and/or after a certain number of retries fail, a network element failure is considered to have been detected. A serving gateway failure can be detected by the RANs under the serving gateway and/or by the other core network elements to which the serving gateway connects, in particular by the IAS anchor 191.

Decision Making on Redundancy Backup Mobility Procedure Trigger

Service continuity in case of network element failure may require knowledge of the total required resources and the total available resources. If the available resources are limited, the redundancy backup mobility procedure should typically not be triggered. In general, the capacity for providing service by this mechanism might be known from the wireless network call profiles such as inter-RAT/inter-network handoff types and their percentages, together with the capacities of the RANs and the core networks in the network planning phase.

Centralized Radio Resources Management Entity

In an inter-RAT/inter-network system, a centralized entity for management of radio resources may be necessary for utilization and optimization of network-wide resources. Since the IAS anchor 191 might logically connect to all or most of the gateways in an inter-RAT/inter-network system, the IAS anchor 191 can be an appropriate location, physically or logically, to implement such a function. The centralized radio resources management entity can be referred to as the inter-RAT/inter-network redundancy controller (IRC) 193. It may be desirable that the IRC 193 have the capability to keep track of the real time resource utilization status for all the elements in the network, detect core network element failures, store (or retrieve from the HSS/AAA 131) the needed UE information for service continuity redundancy backup, make decisions on the redundancy backup mobility procedure trigger with available resources utilization, and distribute network load balancing information to the related network entities for use in network load balancing activities.

Information required for target RAN (or cell) determination for the UEs

The determination of the target RAN (or cell) for each UE as a backup when a core element fails might require the following basic information from the system: a gateway list; a RAN list for each gateway; an overlay RAN list for each RAN; the radio resources in use and the radio resources available for each RAN; an idle UE list and an active UE list for each service RAN; a neighbor cell list for each UE; real time measurement reports on the neighbor cells for each UE together with a Qoffset for each cell; and UE service policies, such as the priorities, capabilities, and similar parameters assigned by the operators.

The above information can be shared, transferred, and/or stored among the network element entities according to known procedures for splitting functions between RANs and the core network. Based on the available information, the core network (particularly the IRC 193) could determine the target RAN for each UE and inform the UE of the determination in case of a service backup via mobility trigger. Details on how to utilize the information is known to one of skill in the art. The RAN parameters useful in determining the target RANs could be: RAN_id, Radio, gateway_id, overlay RAN_id(s) (or cell-ids), resource_in_use, resource_available, etc. An example of such information usage is given below.

Other factors that might also be considered in the determination of the target RAN for each UE include radio signaling conditions, the Qoffset for the neighbor cells, network load balancing, and other information provided by the core. In addition, cell ranking criteria and cell selection criteria can be applied.

If the information in the IRC 193 regarding the target cell/RAN IDs for the UEs is derived from the transfer and storage of normal operation information, then the IRC 193 can specify the target cell/RAN IDs for the UEs in one or more redundancy backup commands. If the IRC 193 cannot obtain the information on the UEs' target cell/RAN IDs from normal operation information, then the IRC 193 can use the RAN IDs and gateway IDs that are overlaid on the UEs' source RANs as candidate target RAN IDs and gateway IDs for use in the redundancy backup commands.

UE Information Retrieval and UE Classification

When a serving gateway fails, UE profiles might be lost. The UE information can be stored during normal operations in the core (e.g., in the IRC 193) for redundancy handling use. However, this can impact real time traffic under normal operation. It should be noted that each UE in the system is registered with its gateway ID and its tracking area ID (RAN ID) in the HSS/AAA 131. When a serving gateway fails, in general the UE IDs and location information for all the UEs under that gateway can be queried from the HSS/AAA 131 by providing the gateway ID. In the case of massive UE file retrieval for a large capacity gateway, the UE information retrieval can be performed on a step-by-step basis for each RAN to prevent signaling jam. Correspondingly, the service backup procedure can also be performed in a step-by-step sequence.

UEs can be classified into two categories, idle and active. Normally, when a serving gateway fails, the idle UEs can be steered to other RANs according to resource availability. To minimize the service interruption time for an active UE, the UE's profile as well as real time information such as the UE's contexts might need to be transferred and stored. However, the transfer of real time information among the network entities could create excessive signaling traffic. This may not be desirable. In practice, based on the UE subscribed options, the real time information might be transferred and stored only for high priority UEs. For low priority UEs, longer service interruption and/or service re-establishment time periods may be tolerated during a service recovery.

Modifications to Mobility Procedures for Redundancy Backup

Under normal mobility handling procedures, the target system might communicate with the source system for UE cell reselection or handover. The embodiments of the mobility handling procedures triggered by service backup, as described herein, may entail some adjustments to the normal mobility handling procedures. The adjustments might include network element failure detection, multiple UE mobility triggers, multiple UE mobility handling, and management of a possible lack of information forwarding between the source system and the target system. In addition, there may be a need for a real time transfer to the core, during normal operation, of information related to the active UEs that require service continuity under network element failure conditions. Target RAN information based on a network load balancing analysis from the core to the RANs/UEs may also be needed. To prevent a possible signaling traffic jam caused by redundancy backup commands to a group of UEs, UE-by-UE sequential messaging may be used.

Classification of Mobility Procedures for Redundancy Backup

Redundancy backup can be implemented in different manners depending on whether a UE is in the active state or the idle state. For idle UEs, the mobility procedures for redundancy backup can involve reselection and/or steering of networks and/or cells for a group of UEs. For active UEs, the mobility procedures for redundancy backup can involve inter-RAT handover for a group of UEs.

In addition, depending on how the gateway failure was detected and whether any signaling paths to the impacted serving RANs are still available, different approaches can be taken to extend inter-RAT/inter-network mobility functionalities and ensure UE service continuity. The approaches can be classified based on the following two cases.

In a first case, the serving RAN has a list of UEs that it is serving and the serving RAN detects the serving gateway failure. In this case, the serving RAN acts as a trigger for redundancy backup, and one of two methods might be used to achieve redundancy backup. In a first method, which can be referred to as method 1-1, the serving RAN sends redundancy backup handover commands to its active UEs and sends redundancy reselection commands to its idle UEs with the target RAN information. Since the source RAN (or serving RAN) directly triggers the redundancy backup, network balancing can be considered depending on whether the source RANs have network-wide load balancing information from the core (or the IRC 193). A second method, which can be referred to as method 1-2, involves waiting for redundancy mobility procedure triggers from the network (or the IRC 193) as in the second case, below. However, since the serving RAN typically does not have a list of UEs that it is serving, this first case may not be applicable.

In a second case, the core network (or the IRC 193) detects the serving gateway failure. In a first method under this case, which can be referred to as method 2-1, the network (or the IRC 193) does not have any signaling paths to the serving RANs. In such a situation, the network can initiate a redundancy backup handover (or relocation) command (for active UEs) and a redundancy reselection command (for idle UEs) to the determined target RANs via the determined target gateways. The target RANs can then send the relocation (handover) command and the reselection command via paging broadcasts to the impacted UEs together with the target RANs' information. To save battery usage that might be needed for the UEs to continuously monitor the target RANs' paging channels under normal operation, the serving RANs might send out a "start monitoring target RAN paging" type message to the UEs after the source gateway failure detection.

In a second method under this case, which can be referred to as method 2-2, the network (or the IRC 193) does have signaling paths to the serving RANs. In such a situation, the IRC 193 can initiate a redundancy backup handover (or relocation) command (for active UEs) and a redundancy reselection command (for idle UEs). The commands can be sent to the serving RANs via the determined target gateways. Each serving RAN can then send redundancy backup commands to its UEs with the target RAN information.

Dual Mode and Multiple Technology UE and Inter-RAT UE Neighbor Cell Measurement

Since this disclosure considers inter-RAT mobility, dual mode and multiple technology UEs are assumed. That is, the UEs under consideration can operate in a plurality of technologies that might include both the circuit switched mode and the packet switched mode. The inter-RAT neighbor cell list of a UE might therefore consist of cell ID/public land mobile network (PLMN) ID pairs. The PLMN IDs can be stored in the UE's subscriber identity module (SIM) or can be broadcast by the network. Following known telecommunications standards for a multi-RAT UE, the network can control the identification and measurement of cells belonging to other RATs. The measurements can be configured to be periodic or can be event driven when the serving cell/RAN radio channel signal is inadequate. Alternatively or in addition, the measurements can be ordered by the network.

UE Monitoring the Target RAN Paging Channel

For the cases where the signaling paths to the source (serving) RAN of the failed (serving) gateway are all disconnected, broadcast paging might be used to issue the redundancy backup commands. This assumes that the UEs are monitoring the target RAN/cell paging channels. To save the UEs' batteries, longer inactive and shorter active monitoring time periods could be used. Alternatively, the UEs could start to monitor the target RAN paging channels from an instruction issued by the source (serving) RAN when the serving RAN detects the serving gateway's problem.

UE Responses to a Redundancy Backup Command Having a Target Cell ID/RAN ID

If a UE receives a redundancy backup command from a broadcast paging channel, and if the received target cell ID is in the UE's neighbor cell list and the cell's channel conditions are satisfied, then the UE can respond to the message and move to the given target cell. Otherwise, the UE may not respond.

It should be noted that, if the redundancy command is issued by a paging channel, the target RAN/cell radio conditions may not be checked first; the UE may need to check the RAN/cell radio conditions to determine the move. If a redundancy command is issued via a traffic channel, the target radio conditions might have already been checked.

Depending on the UE's existing capabilities and the inter-RAT/inter-network mobility procedures, the mobility procedures as modified for redundancy backup may not have any functional impact on the UE. Any impact on the UE that does occur is expected to be small.

The above issues and possible solutions for service continuity via inter-RAT/inter-network mobility handling when a core network element fails in an inter-RAT/inter-network system can be implementation dependent.

Examples of procedures for a network trigger according to method 2-1 and method 2-2 mentioned above are presented in the following. Examples of network trigger redundancy backup procedures using inter-RAT/inter-network mobility mechanisms for active UEs will be considered first. In a first network trigger situation, there are no signaling paths from the IAS anchor 191 to the impacted RANs. The following is a high level summary for an embodiment of a redundancy backup procedure from the network for method 2-1.

When network element (gateway) failure occurs, gateway_i for example, the failure might be detected by the IRC 193. The IRC 193 will check if the total available radio resources in the identified target RANs are sufficient for a back-up. If the resources are not sufficient, redundancy backup is not performed. If the resources are sufficient, the IRC 193 triggers the redundancy backup function by retrieving the impacted UE IDs from the HSS/AAA 131 and sending a group of redundancy backup request messages to the identified target gateways that have RANs overlaid with the source RANs under the source gateway_i. Also at this point, to save battery power, the serving RANs could send out a "start monitoring target RAN paging" type message to the UEs, rather than the UEs continuously monitoring the target RANs' paging channels.

Upon receiving one of the redundancy backup request messages, each target gateway, gateway_m for example, checks its RAN list to find the RANs (targets) overlaid with the source RANs under source gateway_i. Then the target gateway_m sends a redundancy backup request message to each of its target RANs together with information on the source RANs under the source gateway_i. The identification of the target RANs under the target gateway_m can be done by the IRC 193 as part of the check of available resources. Each target RAN under gateway_m, upon receiving a redundancy backup message with the source RANs under gateway_i, can send redundancy backup relocation broadcasting paging messages to the UEs indicating the source RAN IDs (or source RAN cell IDs) and the candidate target RAN IDs (or target RAN cell IDs) to which the UEs could relocate.

For each paging response from the impacted UEs with their UE IDs, the target RAN can issue relocation commands to the UEs to start the relocation (handover) process. A target RAN can relocate the responding UEs until all of the UEs are relocated or until a redundancy backup relocation timer times out or the available radio resources reach a limit. The target RAN can then send a redundancy backup relocation response message to its serving gateway. Redundancy backup relocation response messages can be sent from all of the target RANs to their gateways and then from the target gateways to the IRC 193 upon redundancy backup completion.

Figure 3:
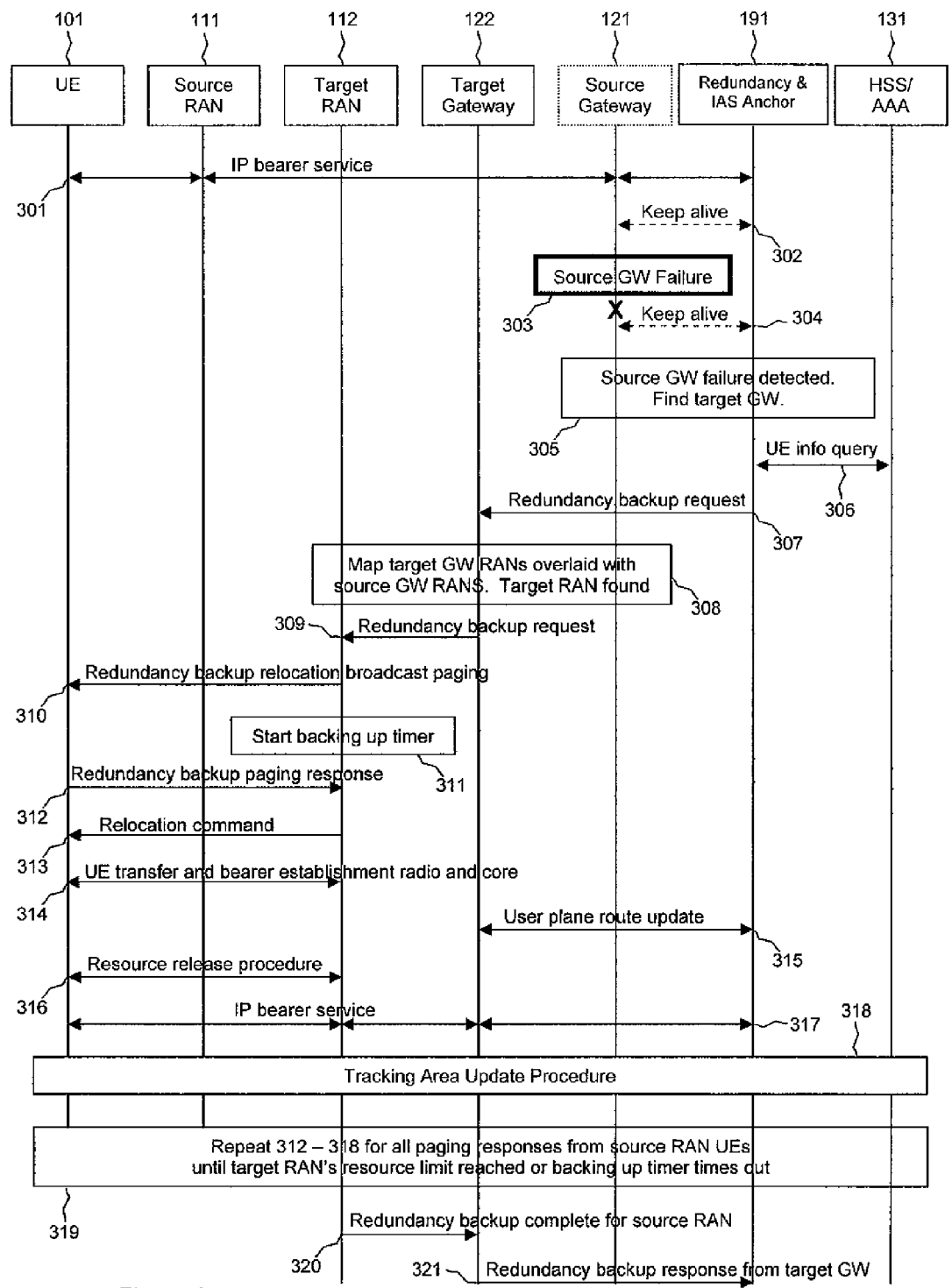
FIG. 3 is a call flow diagram according to an embodiment of the disclosure.

This redundancy backup procedure is illustrated in FIG. 3. At event 301, IP bearer service is established between the UE 101 and the IAS anchor 191 via the source RAN 111 and the source gateway 121. In this case, the IAS anchor 191 includes the IRC 193 as shown in FIG. 1, and actions described in relation to the IAS anchor 191 might actually occur in relation to the IRC 193. At event 302, keep-alive messages are sent in a timely manner between the IAS anchor 191 and the source gateway 121 for gateway status detection.

At event 303, the source gateway 121 fails. At event 304, a gateway keep-alive response fails and a keep-alive timer times out. At event 305, the IAS anchor 191 detects the failure of the source gateway 121. Then a check is made whether there are sufficient available radio resources from the overlaid radio networks to back up the services of the source gateway 121. At event 306, the available resource check is successful. The IAS anchor 191 retrieves information on IDs and locations (RANs) for the impacted UEs from the HSS/AAA 131 by providing the failed gateway ID. At this point, to save battery power, the serving RANs might send out a "start monitoring target RAN paging" type message to the UEs after the detection of the source gateway failure, rather than the UEs continuously monitoring the target RANs' paging channels.

At event 307, the IAS anchor 191 triggers the redundancy backup procedure for the source gateway 121 by sending redundancy backup request messages to all of the gateways overlaid on the source gateway 121, according to the source gateway's gateway overlay list. Information on the UEs is included. At event 308, upon receiving the redundancy backup request message, each overlay gateway to the source gateway 121 starts to map its RANs overlaid with the RANs in the source gateway 121. In this example, the target gateway RANs overlay with the source gateway RANs, and the target RAN 112 is found.

At event 309, the target gateway 122 sends a redundancy backup request message to each of its RANs overlaid with the source gateway RANs. In this case, the target gateway 122 sends the redundancy backup request message to the target RAN 112. At event 310, the target RAN 112 sends a redundancy backup relocation request message to the source RAN's UEs via broadcast paging. At event 311, the target RAN 112 starts a redundancy backup action timer. At event 312, the UE 101 sends a response back after receiving the redundancy relocation paging. At event 313, for each relocation paging response received from an impacted UE, the target RAN 112 sends a relocation command to the UE. At event 314, upon receiving the relocation command, the UE 101 starts its relocation to the target RAN 112 and then a bearer is established for the radio and the core.

At event 315, a user plane route update for the UE 101 with the IAS anchor 191 occurs. At event 316, the UE 101 releases the previous bearer resources if the resources are still on hold. At event 317, the UE 101 starts its IP service with the new RAN 112. At event 318, the UE 101 may need to update its tracking area with the HSS/AAA 131. At event 319, for each redundancy relocation response received, events 312 through 318 are repeated until all the UEs are relocated, the backup timer times out, or the target RAN 112 reaches its available radio resource limit. At event 320, the target RAN 112 stops the backup process and sends redundancy backup response message to its target gateway 122. At event 321, upon receiving responses from all the RANs connecting to the target gateway 122, the target gateway 122 sends a response message to the IAS anchor 191 to complete the target gateway's backup function. It should be noted that the IAS anchor's request for redundancy backup for the source gateway 121 is typically completed after the IAS anchor 191 receives responses from all the requested gateways.

In a second network trigger situation, there are signaling paths from the IAS anchor 191 to the impacted RANs. The following is a high level summary for a redundancy backup process from the network for method 2-2 described above. When a failure of a network element (a gateway) occurs, gateway_i for example, the failure is detected by the IRC 193. The IRC 193 checks whether the total available radio resources from the identified target RANs are sufficient for back-up. If the resources are not sufficient, there is no redundancy backup. If the resources are sufficient, the IRC 193 triggers the redundancy backup function by retrieving a list of impacted UEs from the HSS/AAA 131 and sending a group of redundancy backup request messages to the identified target gateways that are overlaid with the source gateway_i.

Upon receiving a redundancy backup request message, each target gateway, gateway_m for example, checks which of its RANs are overlaid with the source RANs under gateway_i. Then the gateway_m sends a redundancy backup initiation request message to its target RANs together with information on the UEs and their source RANs to back up. Each target RAN under gateway_m, upon receiving a redundancy backup initiation message, sends a redundancy backup initiation message to each of the source RANs with their UE information. Each source RAN under gateway_i, upon receiving a redundancy backup initiation message from a target RAN under a different gateway, starts UE relocations with each of the target RANs. One UE might be relocated in a specified time interval, such as every 200 milliseconds, to prevent a relocation messaging jam. Redundancy complete messages can then be sent from the source RANs to the target RANs, then to the target gateways, and finally ending at the IRC 193 upon redundancy backup completion (or service continuity relocation completion).

Figure 4:
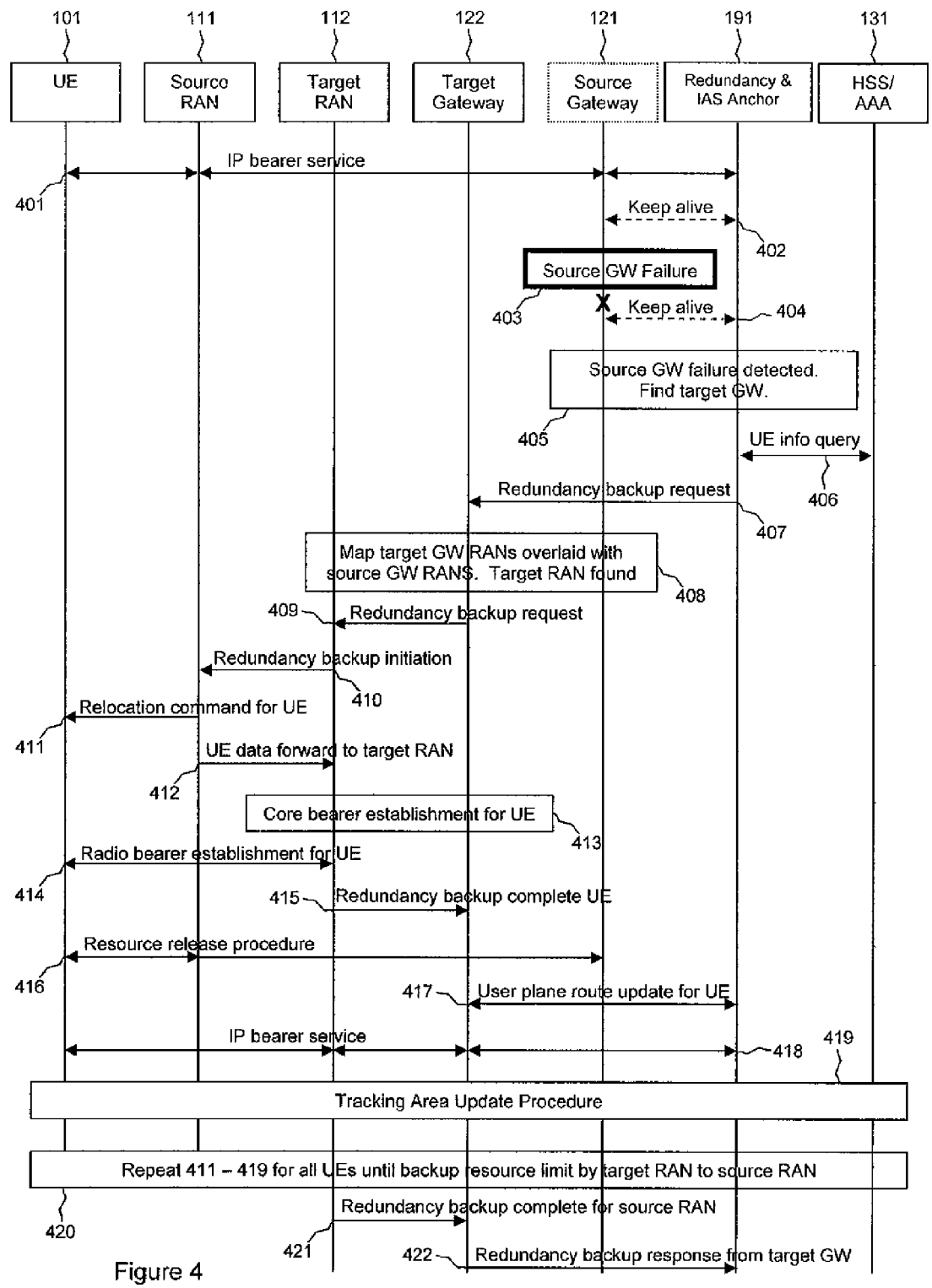
FIG. 4 is another call flow diagram according to an embodiment of the disclosure.

This redundancy mechanism procedure is illustrated in FIG. 4. At event 401, IP bearer service is established between the UE 101 and the IAS anchor 191 via the source RAN 111 and the source gateway 121. The IAS anchor 191 again includes the IRC 193, as in FIG. 1, and actions described in relation to the IAS anchor 191 again might actually occur in relation to the IRC 193. At event 402, keep-alive messages are sent in a timely manner between the IAS anchor 191 and the source gateway 121 for status detection.

At event 403, the source gateway 121 fails. At event 404, a keep-alive timer for the source gateway status test times out. At event 405, the IAS anchor 191 detects the failure of the source gateway 121. The IAS anchor 191 then checks if there are sufficient available radio resources from the overlay radio networks to back up the source gateway 121. At event 406, the available resource check is successful. The IAS anchor 191 retrieves information on the IDs and locations (RANs) for the impacted UEs from the HSS/AAA 131 by providing the failure gateway ID to the HSS/AAA 131.

At event 407, the IAS anchor 191 triggers the redundancy backup procedure to back up the source gateway 121 by sending redundancy backup request messages to all of the identified overlay gateways of the source gateway 121. Information on the UEs is included. At event 408, upon receiving one of the redundancy backup request messages, each identified overlay gateway of the source gateway 121 starts to map its RANs overlaid with the RANs in the source gateway 121. In this example, the target gateway's RAN 112 overlays the source gateway's RAN 111. At event 409, the target gateway 122 sends a redundancy backup initiation request message to each of its RANs overlaid with the source gateway's RANs. In this example, the target gateway 122 sends the redundancy backup initiation request message to the target RAN 112.

At event 410, the target RAN 112 sends a redundancy backup initiation request message with UE information to the source RAN 111. Each target RAN in the target gateway 122 overlaid with the source RANs, upon receiving a redundancy backup initiation request message, sends a redundancy backup initiation message to each of the source RANs that it overlays to initialize the backup. At event 411, upon receiving a request from a target RAN, each source RAN under the source gateway 121 starts UE service backup by sending a relocation command with the target RAN ID for the UEs to move to. One UE might be relocated in a specified time interval, such as every 200 milliseconds, to prevent a massive relocation messaging jam.

At event 412, in the case where the source RAN 111 is 3G, the source RAN 111 may forward the UE data to the target RAN 112 to minimize data loss. At event 413, the target gateway 122 establishes core bearer resources for the UE 101. At event 414, a radio bearer is established between the UE 101 and the target RAN 112. At event 415, the target RAN 112 informs the target gateway 122 about handover completion for the UE 101. At event 416, resources in the source system (RAN 111 and gateway 121) for the UE 101 are released. At event 417, the target gateway 122 updates the route from the IAS anchor 191 to itself. Mobile terminated packets arrive at the new gateway 122.

At event 418, IP bearer service is established between the UE 101 and the IAS anchor 191 via the target RAN 112 and the target gateway 122. At event 419, the UE 101 may need to perform a tracking area update with the target gateway 122. This can trigger the target gateway 122 to register with the HSS/AAA 131. At event 420, events 411 through 419 are repeated for all the UEs commanded to move to the target RAN 112 until all of the UEs are relocated or until the given resource limit for the target RAN 112 is reached. It should be noted that the message flows in the repeated events 411 through 419 can be simplified for UE group actions on user plane route updates, resource releases, and tracking area update procedures. At event 421, the target RAN 112 acknowledges to the target gateway 122 the redundancy backup completion for the source RAN 111. At event 422, upon receiving redundancy backup completion messages from all of its requested target RANs, the target gateway 122 sends a redundancy backup response to the IAS anchor 191. Redundancy backup is complete upon the IAS anchor 191 receiving response messages from all of the requested target gateways.

Figure 5:
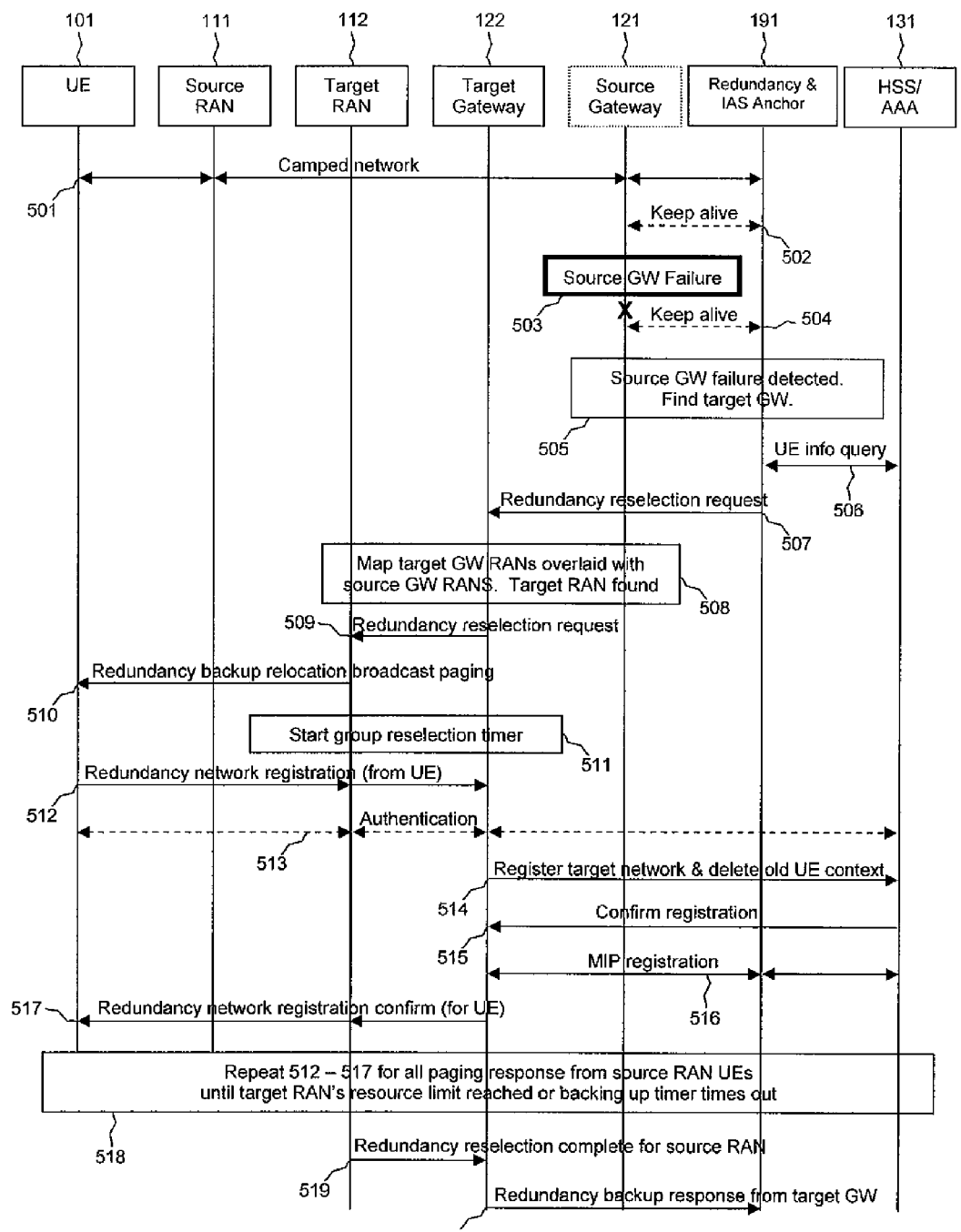
FIG. 5 is another call flow diagram according to an embodiment of the disclosure.

An example of redundancy backup procedures using inter-RAT/inter-network mobility mechanisms for idle UEs will now be provided. In the following example procedure for idle UEs, network/cell reselection follows method 2-1 described above, and there are no signaling paths from the IAS anchor 191 to the impacted RANs. This redundancy network/cell reselection procedure is illustrated in FIG. 5. At event 501, the UE 101 is camped with the source RAN 111 and the source gateway 121. At event 502, keep-alive messages are sent in a timely manner between the IAS anchor 191 and the source gateway 121 for gateway status detection. The IAS anchor 191 again includes the IRC 193, as in FIG. 1, and actions described in relation to the IAS anchor 191 again might actually occur in relation to the IRC 193.

At event 503, the source gateway 121 fails. At event 504, the gateway keep-alive response fails and the keep-alive timer times out. At event 505, the IAS anchor 191 detects the failure of the source gateway 121. The IAS anchor 191 then checks if there are sufficient available radio resources from the overlaid radio networks in order to back up the services of the source gateway 121. At event 506, the available resource check is successful. The IAS anchor 191 retrieves information on IDs and locations (RANs) for the impacted UEs from the HSS/AAA 131 by providing the failed gateway ID to the HSS/AAA 131. At this point, to save battery power, the serving RANs might send out a "start monitoring target RAN paging" type message to the UEs after detection of the source gateway failure, rather than the UEs continuously monitoring the target RANs' paging channels.

At event 507, the IAS anchor 191 triggers the redundancy backup procedure to back up the source gateway 121 by sending redundancy reselection request messages to the identified overlay gateways of the source gateway 121, according to the source gateway's gateway overlay list. UE information can be included. At event 508, upon receiving one of the redundancy reselection request messages, each overlay gateway of the source gateway 121 starts to map its RANs overlaid with the RANs in the source gateway 121. In this example, the target gateway RANs overlay the source gateway RANs, and the target RAN 112 is found.

At event 509, the target gateway 122 sends a redundancy reselection request message to each of its RANs overlaid with the source gateway RANs. In this case, the target gateway 122 sends a redundancy reselection request message to the target RAN 112. At event 510, the target RAN 112 sends a redundancy backup relocation request message to the source RAN's UEs via broadcast paging. At event 511, the target RAN 112 starts a redundancy group network/cell reselection action timer. At event 512, the UE 101 sends a network registration request to the target RAN 112 and then to the target gateway 122 after receiving the redundancy relocation paging and a target cell signal strength check.

At event 513, the UE 101 may be authenticated in the target gateway 122. At event 514, the target gateway 122 registers itself as the new gateway serving the UE 101 at the HSS/AAA 131. The HSS/AAA 131 deletes the old context for the UE 101. At event 515, the HSS/AAA 131 confirms the registration of the new gateway 122 for the UE 101. At event 516, a user plane route update with the IAS anchor 191 for the UE 101 is performed, and the mobile terminated packets arrive at the new gateway 122. At event 517, the new gateway 122 confirms the network registration for the UE 101.

At event 518, on the target RAN 112, for each redundancy relocation response received, events 512 to 517 are repeated until all of the UEs are relocated or until the reselection timer times out or the target RAN 112 reaches its available radio resource limit. At event 519, the target RAN 112 stops the backup process and sends a redundancy reselection response message to the target gateway 122. At event 520, upon receiving responses from all of the RANs connecting to the target gateway 122, the target gateway 122 sends a response message to the IAS anchor 191 regarding the completion of the target gateway's group reselection function. It should be noted that the IAS anchor's request for redundancy network/cell reselection for the source gateway 121 is typically completed after the IAS anchor 191 receives responses from all of the requested gateways.

Figure 6:
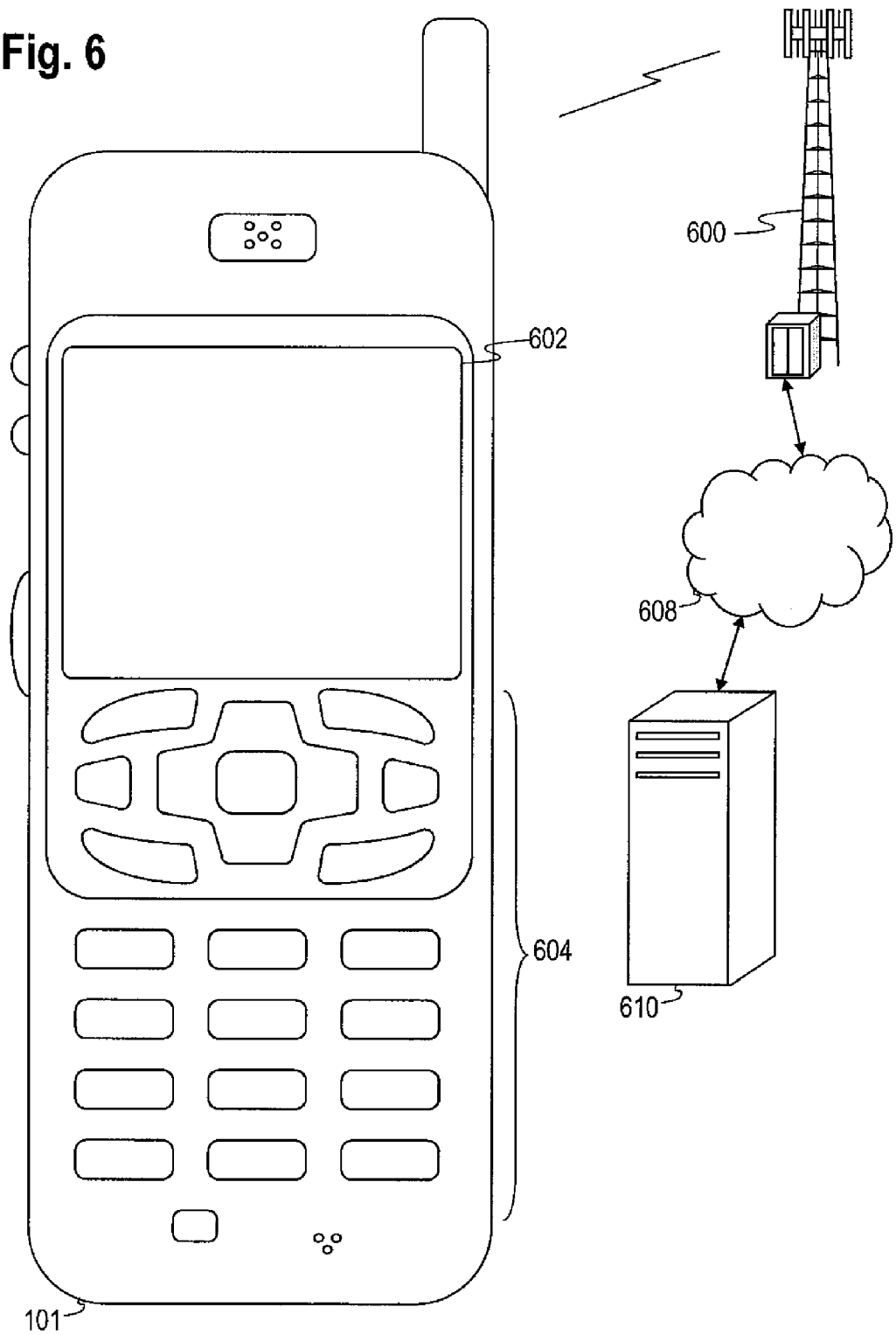
FIG. 6 is a diagram of a wireless communications system including a user equipment operable for some of the various embodiments of the disclosure.

FIG. 6 illustrates a wireless communications system including an embodiment of the UE 101. The UE 101 is operable for implementing aspects of the disclosure, but the disclosure should not be limited to these implementations. Though illustrated as a mobile phone, the UE 101 may take various forms including a wireless handset, a pager, a personal digital assistant (PDA), a portable computer, a tablet computer, or a laptop computer. Many suitable devices combine some or all of these functions. In some embodiments of the disclosure, the UE 101 is not a general purpose computing device like a portable, laptop or tablet computer, but rather is a special-purpose communications device such as a mobile phone, wireless handset, pager, or PDA. In another embodiment, the UE 101 may be a portable, laptop or other computing device. The UE 101 may support specialized activities such as gaming, inventory control, job control, and/or task management functions, and so on.

The UE 101 includes a display 602. The UE 101 also includes a touch-sensitive surface, a keyboard or other input keys generally referred as 604 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 101 may present options for the user to select, controls for the user to actuate, and/or cursors or other indicators for the user to direct. The UE 101 may further accept data entry from the user, including numbers to dial or various parameter values for configuring the operation of the UE 101. The UE 101 may further execute one or more software or firmware applications in response to user commands. These applications may configure the UE 101 to perform various customized functions in response to user interaction. Additionally, the UE 101 may be programmed and/or configured over-the-air, for example from a wireless base station, a wireless access point, or a peer UE 101.

Among the various applications executable by the UE 101 are a web browser, which enables the display 602 to show a web page. The web page may be obtained via wireless communications with a wireless network access node, a cell tower, a peer UE 101, or any other wireless communication network or system 600. The network 600 is coupled to a wired network 608, such as the Internet. Via the wireless link and the wired network 608, the UE 101 has access to information on various servers, such as a server 610. The server 610 may provide content that may be shown on the display 602. Alternately, the UE 101 may access the network 600 through a peer UE 101 acting as an intermediary, in a relay type or hop type of connection.

Figure 7:
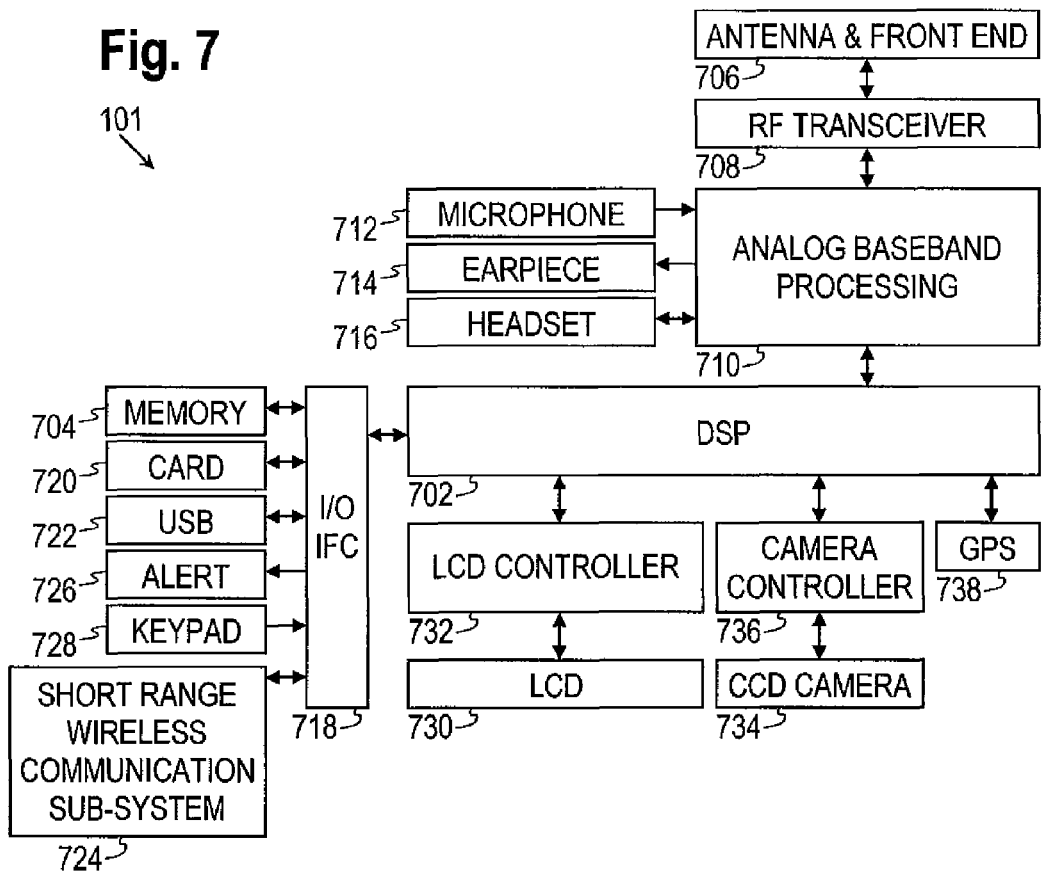
FIG. 7 is a block diagram of a user equipment operable for some of the various embodiments of the disclosure.

FIG. 7 shows a block diagram of the UE 101. While a variety of known components of UEs 101 are depicted, in an embodiment a subset of the listed components and/or additional components not listed may be included in the UE 101. The UE 101 includes a digital signal processor (DSP) 702 and a memory 704. As shown, the UE 101 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, a short range wireless communication sub-system 724, an alert 726, a keypad 728, a liquid crystal display (LCD), which may include a touch sensitive surface 730, an LCD controller 732, a charge-coupled device (CCD) camera 734, a camera controller 736, and a global positioning system (GPS) sensor 738. In an embodiment, the UE 101 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the UE 101 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the UE 101 to send and receive information from a cellular network or some other available wireless communications network or from a peer UE 101. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF Transceiver 708, portions of the Antenna and Front End 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset 716 and outputs to the earpiece 714 and the headset 716. To that end, the analog baseband processing unit 710 may have ports for connecting to the built-in microphone 712 and the earpiece speaker 714 that enable the UE 101 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast Fourier transforming, and cyclic prefix appending, and for a receiver function the DSP 702 may perform cyclic prefix removal, fast Fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB interface 722 and the short range wireless communication sub-system 724. The USB interface 722 may be used to charge the UE 101 and may also enable the UE 101 to function as a peripheral device to exchange information with a personal computer or other computer system. The short range wireless communication sub-system 724 may include an infrared port, a Bluetooth interface, an IEEE 802.11 compliant wireless interface, or any other short range wireless communication sub-system, which may enable the UE 101 to communicate wirelessly with other nearby mobile devices and/or wireless base stations.

The input/output interface 718 may further connect the DSP 702 to the alert 726 that, when triggered, causes the UE 101 to provide a notice to the user, for example, by ringing, playing a melody, or vibrating. The alert 726 may serve as a mechanism for alerting the user to any of various events such as an incoming call, a new text message, and an appointment reminder by silently vibrating, or by playing a specific pre-assigned melody for a particular caller.

The keypad 728 couples to the DSP 702 via the interface 718 to provide one mechanism for the user to make selections, enter information, and otherwise provide input to the UE 101. The keyboard 728 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 730, which may include touch screen capability and also display text and/or graphics to the user. The LCD controller 732 couples the DSP 702 to the LCD 730.

The CCD camera 734, if equipped, enables the UE 101 to take digital pictures. The DSP 702 communicates with the CCD camera 734 via the camera controller 736. In another embodiment, a camera operating according to a technology other than Charge Coupled Device cameras may be employed. The GPS sensor 738 is coupled to the DSP 702 to decode global positioning system signals, thereby enabling the UE 101 to determine its position. Various other peripherals may also be included to provide additional functions, e.g., radio and television reception.

Figure 8:
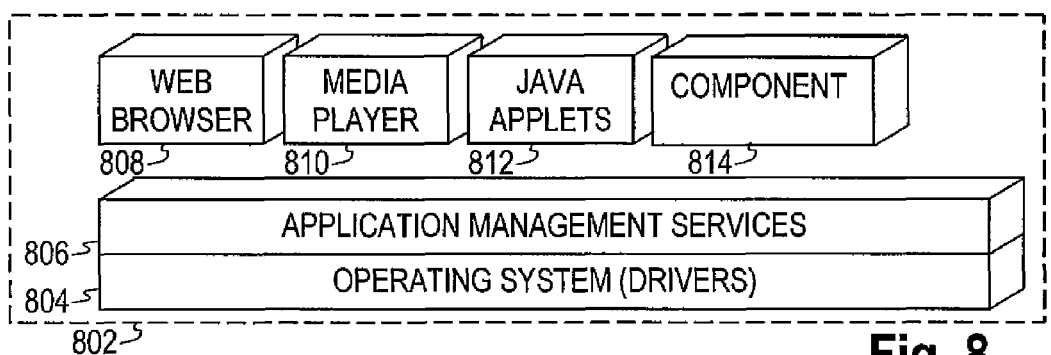
FIG. 8 is a diagram of a software environment that may be implemented on a user equipment operable for some of the various embodiments of the disclosure.

FIG. 8 illustrates a software environment 802 that may be implemented by the DSP 702. The DSP 702 executes operating system drivers 804 that provide a platform from which the rest of the software operates. The operating system drivers 804 provide drivers for the node hardware with standardized interfaces that are accessible to application software. The operating system drivers 804 include application management services ("AMS") 806 that transfer control between applications running on the UE 101. Also shown in FIG. 8 are a web browser application 808, a media player application 810, and Java applets 812. The web browser application 808 configures the UE 101 to operate as a web browser, allowing a user to enter information into forms and select links to retrieve and view web pages. The media player application 810 configures the UE 101 to retrieve and play audio or audiovisual media. The Java applets 812 configure the UE 101 to provide games, utilities, and other functionality. A component 814 might provide functionality related to service continuity.

Figure 9:
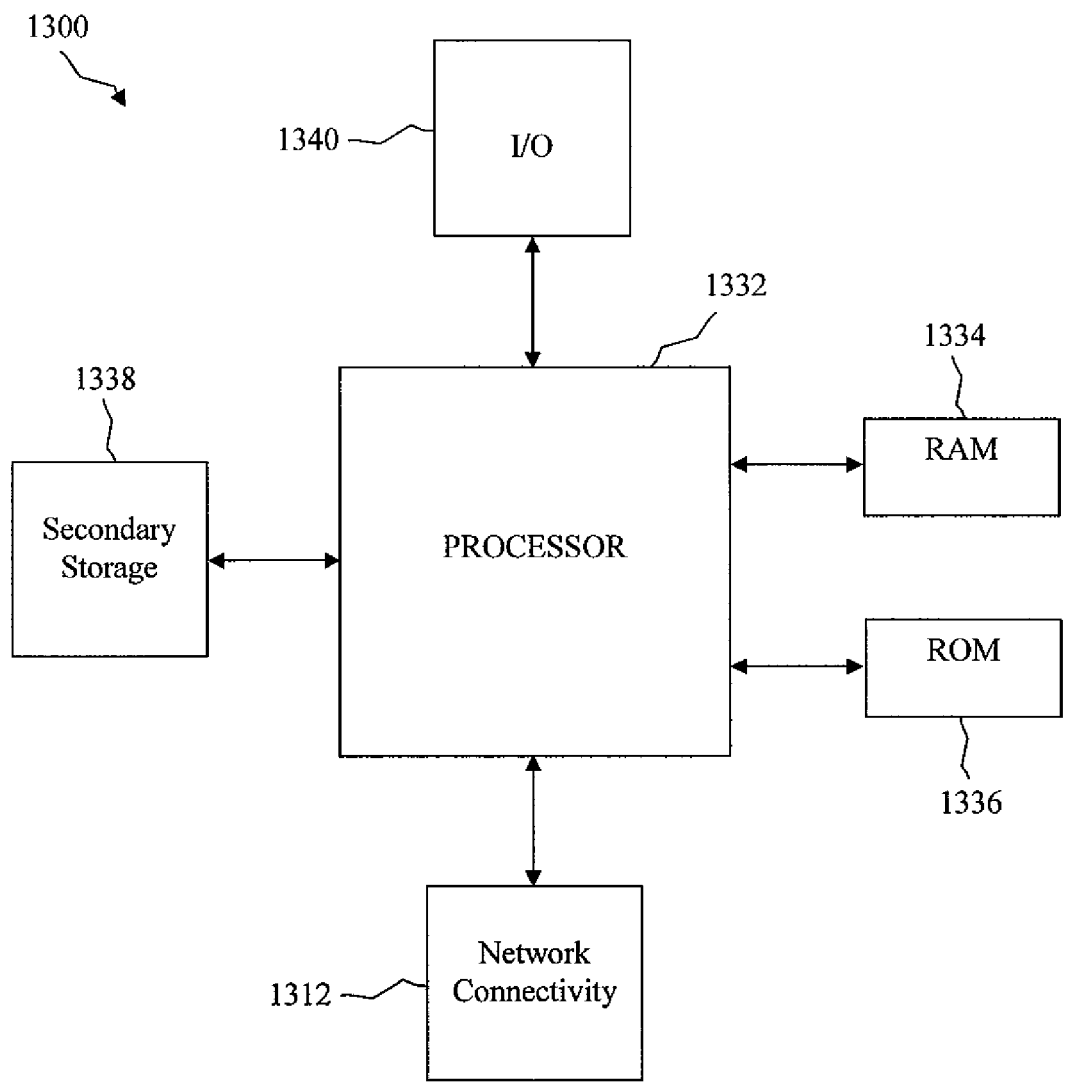
FIG. 9 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

The following are incorporated herein by reference for all purposes: $3^{rd}$ Generation Partnership Project (3GPP) Technical Report (TR) 23.882 and Technical Specification (TS) 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Example of Using Available Information for Redundancy Backup Trigger Determination It is assumed that in the inter-RAT/inter-network system, each RAN maintains an active UE list and an idle UE list for the UEs in service. Each UE maintains a neighbor cell list. Since each neighbor cell belongs to a certain RAN, from the UE neighbor cell lists, the UEs can be classified into target RAN groups with satisfied radio conditions. The following are UE target RAN group classification examples:

$$\{UE\_11; \ldots ; UE\_1n\} \in RAN\_11 \in gateway\_1;$$
$$\{UE\_21; \ldots ; UE\_2n\} \in RAN\_23 \in gateway\_2;$$
$$\ldots \ldots \ldots$$
$$\{UE\_m1; \ldots ; UE\_mn\} \in RAN\_m5 \in gateway\_m.$$

The target RAN group classifications can be used as the target RAN information in the redundancy backup handover (relocation) commands to the UEs.

In addition, the following information and steps can be used by the IRC 193 for inter-RAT/inter-network redundancy backup control:

In the IRC 193, there is a gateway list which lists all the gateways connected to it, or:
GW_LIST={gateway_1; ... ; gateway_N}.

For each gateway on the GW_LIST, there is an overlay gateway list in which the RANs of the gateways are overlaid and/or intersect with the RANs of this gateway. For example, gateway_i may be overlaid with gateway_j and gateway_k. The overlay gateway list to gateway_i can be presented as:
gateway_i_OVERLAY={gateway_j; gateway_k}.

For each gateway on GW_LIST, there is a RAN list. For example, the RAN list for gateway_i can be denoted by:
gateway_i_RAN_List={RAN_i1; ... ; RAN_iN}.
This list can also reside in gateway_i.

Each RAN node has parameters indicating its key characteristics for network load balancing and network redundancy applications. For example, for RAN_ip, its key parameter set can be:

RAN_ip_Prams={RAN_ip_id; network_id; gateway_id; radio_resource_in_use_ip; available_radio_resource_ip; cell_ip_1; ... cell_ip_n; ...}

The RAN_ip_Prams can be updated in real time. Each RAN_ip to be backed up might require radio_resource_in_use_ip radio resources. When gateway_i fails or is out of service, then $$\text{total\_required\_radio\_resources\_to\_backup\_gateway\_i} = \sum_{j=1}^{N} \text{radio\_resource\_in\_use\_ij}$$

For each RAN node in the system, there is an overlay RAN list. For example, the overlay RAN list for RAN_ip can be:
RAN_ip_OVERLAY={RAN_m2; RAN_k3; RAN_f5}.

Here, the first index for a RAN ID is used for the gateway sequence number. The second index for a RAN ID is used as the RAN sequence number in that gateway. In this example, at any instant, the available ratio resources for the RAN_ip from its overlay RANs can be obtained as:
available_ratio_resources_for_RAN_ip=available_radio_resource_m2+available_radio_resource_k3+available_radio_resource_f5.

When gateway_i fails, $$\text{total\_available\_radio\_resources\_to\_backup\_gateway\_i} = \sum_{j=1}^{N} \text{available\_radio\_resources\_for\_RAN\_ij} * \alpha\_ij$$

where $\alpha\_ij \leq 1$ is a factor used to save some radio resources for RAN_ij besides backing up.

The invention claimed is:

1. A device comprising:
a controller configured to handover a connection associated with a user equipment (UE) from a first radio access network (RAN) to a second RAN due to a loss of connectivity at the first RAN;
a first network element in communication with the first RAN, and a second network element in communication with the second RAN, the first network element and the second network element having respective logical functionalities of at least one of:
a mobility management element,
a user plane element,
a serving gateway,
a packet data network gateway, or
another core network element; and
at least one of the first network element and the second network element having a logical connection to at least one of:
a home subscriber server, or
an authentication, authorization and accounting server; and
the first network element configured to support inter-RAT/inter-network redundancy functionality by:
receiving at least one radio resource utilization report from a plurality of RANs with which the first network element is in communication;

and passing the report to the controller, wherein the controller is an inter RAT/inter-network redundancy controller (IRC).

2. The device of claim 1, wherein the second RAN is configured to receive a redundancy backup command from the second network element and, if a signaling path does not exist between the second RAN and the first RAN, to broadcast the redundancy backup command directly to the UE via a paging channel, the redundancy backup command promoting relocation of the UE from the first RAN to the second RAN.

3. The device of claim 1, wherein the second RAN is configured to receive a redundancy backup command from the second network element and, if a signaling path exists between the second RAN and the first RAN, to issue the redundancy backup command to the first RAN with information for relocation of the UE from the first RAN to the second RAN.

4. The device of claim 3, wherein the first RAN is configured, upon receiving the redundancy backup command from the second RAN, to relocate the UE to the second RAN by issuing the redundancy backup command to the UE with identifying information for the second RAN.

5. The device of claim 1, wherein the loss of connectivity is based upon a failure of the communication between the first network component and the first RAN.

6. The device of claim 5, wherein the first network component is the serving gateway or the packet data network gateway.

7. The device of claim 1, wherein the second network element is configured to support inter-RAT/inter-network redundancy functionality by:
 maintaining gateway-related inter-RAT/inter-network overlay information;
 receiving and processing a redundancy backup command from the IRC;
 using the RAN overlay mapping list to determine which of the plurality of RANs will be used as the second RAN; and
 issuing the redundancy backup command to the second RAN.

8. The device of claim 7, wherein the IRC is further configured to manage inter-RAT/inter-network redundancy functionality by at least one of:
 connecting a plurality of gateways via internet protocols;
 receiving the radio resource utilization reports periodically from the plurality of gateways;
 maintaining the inter-RAT/inter-network system overlay information;
 maintaining an inter-RAT/inter-network radio resource utilization status and keeping the status updated when new reports arrive;
 monitoring and detecting core network element failures;
 retrieving and storing UE-related identity information and RAN-related identity information;
 analyzing and providing a network failure service backup plan;
 reporting redundancy events to a network management system or a network operations center; or
 assisting in network system load balancing management.

9. The device of claim 8, wherein the IRC is further configured to perform at least one of:
 when available radio resources are sufficient, triggering a redundancy backup function by transmitting to the gateways redundancy backup request commands containing the identities of the second RAN and the UE; or
 when available radio resources are insufficient, determining that the redundancy backup function should not be triggered when a core network element failure is detected.

10. A method of handing over connections between networks, the method comprising:
 handing over a connection associated with a user equipment (UE) from a first radio access network (RAN) to a second RAN due to a loss of connectivity at the first RAN,
 wherein the first RAN is in communication with a first network element, and the second RAN is in communication with a second network element, wherein the first network element and the second network element have respective logical functionalities of at least one of:
  a mobility management element,
  a user plane element,
  a serving gateway,
  a packet data network gateway, or
  another core network element;
 wherein at least one of first network element and the second network element have logical connections to at least one of:
  a home subscriber server, or
  an authentication, authorization and accounting server; and
 wherein the first network element supports inter-RAT/inter-network redundancy functionality by:
  receiving at least one radio resource utilization report from a plurality of RANs with which the first network element is in communication; and
  passing the report to an inter RAT/inter-network redundancy controller (IRC).

11. The method of claim 10, wherein the second RAN is configured to receive a redundancy backup command from the second network element and, if a signaling path does not exist between the second RAN and the first RAN, to broadcast the redundancy backup command directly to the UE via a paging channel, the redundancy backup command promoting relocation of the UE from the first RAN to the second RAN.

12. The method of claim 10, wherein the second network element supports inter-RAT/inter-network redundancy functionality by:
 maintaining gateway-related inter-RAT/inter-network overlay information;
 receiving and processing a redundancy backup command from the IRC;
 using the RAN overlay mapping list to determine which of the plurality of RANs will be used as the second RAN; and
 issuing the redundancy backup command to the second RAN.

13. The method of claim 12, further comprising managing inter-RAT/inter-network redundancy functionality by at least one of:
 connecting a plurality of gateways via internet protocols;
 receiving the radio resource utilization reports periodically from the plurality of gateways;
 maintaining the inter-RAT/inter-network system overlay information;
 maintaining an inter-RAT/inter-network radio resource utilization status and keeping the status updated when new reports arrive;
 monitoring and detecting core network element failures;
 retrieving and storing UE-related identity information and RAN-related identity information;

analyzing and providing a network failure service backup plan;

reporting redundancy events to a network management system or a network operations center; or assisting in network system load balancing management.

14. The method of claim 13, further comprising at least one of:

when available radio resources are sufficient, triggering a redundancy backup function by transmitting to the gateways redundancy backup request commands containing the identities of the second RAN and the UE; or when available radio resources are insufficient, determining that the redundancy backup function should not be triggered when a core network element failure is detected.

15. The method of claim 10, wherein the loss of connectivity is based upon a failure of the communication between the first network component and the first RAN.

16. The method of claim 15, wherein the first network component is the serving gateway or the packet data network gateway.

17. The method of claim 10, wherein at least one of the UE or a network component promotes handing over the connections associated with the UE from the first RAN to the second RAN.

* * * * *